United States Patent [19]

Sager

[11] Patent Number: 4,668,316

[45] Date of Patent: May 26, 1987

[54] WELDING THIN THERMOPLASTIC FILM BY ULTRASONIC ENERGY

[75] Inventor: Thomas B. Sager, Newtown, Conn.

[73] Assignee: Branson Ultrasonics Corporation, Danbury, Conn.

[21] Appl. No.: 807,411

[22] Filed: Dec. 10, 1985

[51] Int. Cl.⁴ .............................................. B29C 65/08
[52] U.S. Cl. .................................. 156/73.1; 156/73.4; 156/73.6; 156/308.4; 156/580.1
[58] Field of Search .................... 156/73.1, 73.4, 73.6, 156/580.1, 580.2, 308.4; 228/1.1, 110; 264/23

[56] References Cited

U.S. PATENT DOCUMENTS 3,508,989 4/1970 Lawrence et al. .................. 156/73.1
3,728,183 4/1973 Wasco et al. ....................... 156/73.1

FOREIGN PATENT DOCUMENTS 55-100122 7/1980 Japan ................................... 156/73.1

Primary Examiner—Michael Wityshyn
Attorney, Agent, or Firm—Ervin B. Steinberg; Philip J. Feig

[57] ABSTRACT

Thin plastic film is welded by ultrasonic energy by placing two layers of film upon one another on a supporting surface having a cavity. A source of ultrasonic energy, such as a resonator, is brought with its output surface in close proximity to, but non-contacting relation with, the exposed surface of the films for coupling ultrasonic energy via a thin air or gas column to the films at the area of the cavity. The dissipation of ultrasonic energy causes a weld and when the films are moved relative to the resonator output surface and supporting surfce, a seam weld is achieved.

12 Claims, 2 Drawing Figures

WELDING THIN THERMOPLASTIC FILM BY ULTRASONIC ENERGY

BACKGROUND OF THE INVENTION

This invention is related to welding thermoplastic materials by ultrasonic energy and, more specifically, concerns a method for welding thin thermoplastic film by ultrasonic energy using gas or air as a coupling medium between the source of energy and the material to be welded.

Welding of thermoplastic film by ultrasonic energy is well known in the art, see for instance U.S. Pat. No. 2,633,894 issued to P. B. Carwile dated Apr. 7, 1953 entitled "Plastic Welding" and U.S. Pat. No. 3,022,814 issued to A. G. Bodine, Jr. dated Feb. 27, 1962 entitled "Method and Apparatus for Sonic Bonding". In the prior art devices, a resonator rendered resonant at an ultrasonic frequency, also known as horn, tool, mechanical amplitude transformer etc., is brought into forced contact with two superposed thermoplastic films to be sealed. The dissipation of ultrasonic energy in the plastic film material causes heating and welding of the material portion contacted by the resonator. In this manner, spot welds are achieved or when the material underneath the resonator is moved a seam weld is provided as described in the patents supra.

The present invention concerns the welding of thin film material without bringing the resonator into physical contact with the film material. In this manner it has been possible to weld film material which is characterized by extreme thinness and material which is difficult to weld.

Quite specifically, in the present invention a support surface having a cavity is provided and film material to be welded is superposed upon the support surface. Ultrasonic energy produced by a resonator is coupled to the film material via an intermediate column or layer of gas, such as air, at the area of the cavity, whereby a weld is achieved. It is important to note that in the present arrangement the output surface of the resonator is not in physical contact with the thermoplastic film material, but is spaced a small distance therefrom so that the ultrasonic energy is coupled to the thermoplastic film by means of an intermediate layer or column of air.

The present invention is particularly suited for welding extremely thin thermoplastic sheet material. For instance, it has been possible to weld two films, each 0.001 inch thick, to each other whereby each layer comprised non-oriented low density polyethelyne film, a material which normally is welded only with great difficulty.

One of the important objects of this invention, therefore, is the provision of a method for welding thin film material by ultrasonic energy.

Another important object of this invention is the provision of a method for welding thin film material by ultrasonic energy without the material to be welded being contacted by the source of ultrasonic energy, such as a resonator.

Another important object of this invention is the provision of a method for welding superposed thin thermoplastic film material using an ultrasonically resonating resonator and a layer of gas, such as air, for coupling the ultrasonic energy to the film material.

Still another important object of this invention is the provision of a method for welding thin thermoplastic film material using a support surface having a cavity and coupling ultrasonic energy to the film material at the area of the cavity by means of a resonator and a layer of gas disposed between the film material and the output surface of the resonator.

Further and still other objects of this invention will be more clearly apparent by reference to the following description when taken in conjunction with the accompanying drawings.

BRIEF IDENTIFICATION OF THE DRAWINGS

FIG. 1 is a schematic view of an arrangement for welding thermoplastic film material by the present invention, and FIG. 2 is a sectional view showing in a greatly enlarged scale the welded thermoplastic film material, such as is apparent when viewed through a microscope.

DETAILED DESCRIPTION OF THE INVENTION

Figure 1:
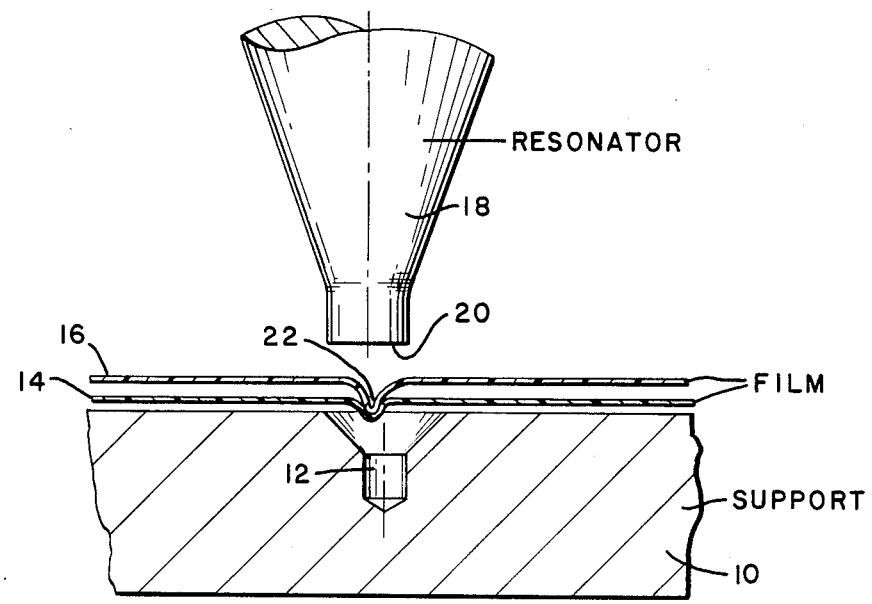
Figure 2:
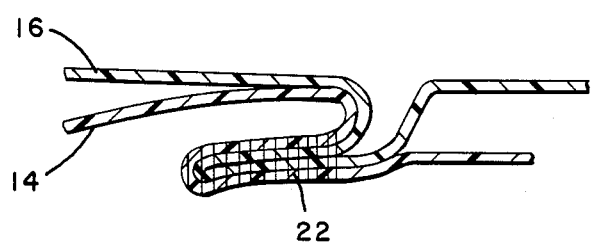

Referring now to the figures, numeral 10 designates a support, preferably made of metal, which is provided with a cavity 12 in the form of a chamfered hole. On the top surface of the support there are disposed in superposed position two thin thermoplastic films 14 and 16 which are to be welded to each other at the general area of the cavity. In order to accomplish such welding there is provided a resonator 18, also known as horn, tool, mechanical amplitude transformer, see "Ultrasonic Engineering" (book) by Julian R. Frederick, John Wiley & Sons, Inc., New York, N.Y. (1965) pp. 87 to 103. Welding is accomplished when the resonator 18 is rendered resonant along its longitudinal axis and the radial output surface 20 is disposed a short distance above the film 22 so that the ultrasonic energy provided by the output surface 20 is coupled to the films by means of the interposed gas or air column. While the exact phenonomenon of welding is not clearly understood, apparently the vibratory air column causes the film 16 to be urged into intimate contact with the film 14 and the dissipation of ultrasonic energy causes a fusion or a weld between the films. It appears that the presence of a cavity 12 permits the films to undergo greater motion, thereby enhancing the welding process. Possibly, the air in the cavity is caused to undergo vibrations. Without the cavity, the results have not been satisfactory. When moving the films through the gap between the support 10 and the output surface 20, a narrow continuous seam is obtained. Viewing the seam under a microscope, a view as seen in FIG. 2 is apparent wherein the welded film portion 22 is tucked under.

In the experiments conducted, the resonator was a high gain resonator of circular cross-section operating at 20 kMz and having a motional excursion at the output surface in the order of 0.002 to 0.005 inch peak to peak; the support 10 was metal; the cavity 12 was a drilled hole ⅜ inch diameter with chamfered entrance, and each of the films 14 and 16 was 0.001 inch thick. The films were non-oriented low density polyethlylene film, a material which is difficult to weld, and the gap between the radial output surface 20 of the resonator 18 and the films 14 and 16 varied form 0.005 to 0.020 inch, a distance from 0.010 to 0.012 inch being preferred.

The present contact-free ultrasonic welding method is particularly well suited for welding extremely thin thermoplastic films. Critical to the operation of the welding is the relatively high motional output of the resonator and the presence of a small air gap distance between the resonator and workpiece since the air acts a severe attenuator for ultrasonic energy. It appears also that best results are obtained when the axis of the resonator 18 is off center with respect to the axis of the drilled cavity 12.

While there has been described and illustrated a preferred embodiment of the present invention, it will be apparent to those skilled in the art that various changes and modifictions may be made without departing from the broad principle of the invention which shall be limited only by the scope of the appended claims.

What is claimed is:

1. The method of welding two superposed layers of thin thermoplastic film by ultrasonic energy comprising: providing a support surface having a cavity;
   disposing the two layers of thin thermoplastic film in superposition upon said support surface and cavity, and
   coupling ultrasonic energy provided by a resonator to the exposed side of said layers opposite said cavity by means of a column of gas without bringing the resonator into physical contact with said layers, whereby to effect welding of said layers to one another at the area of said cavity.

2. The method of welding as set forth in claim 1, said ultrasonic energy being provided by a resonator operating at a frequency above 16 kHz.

3. The method of welding as set forth in claim 2, said resonator being elongated and having a radially disposed output surface which contacts said column.

4. The method of welding as set forth in claim 2, said resonator being off center with respect to said cavity.

5. The method of welding as set forth in claim 1, said support surface being metal.

6. The method of welding as set forth in claim 1, said cavity being a chamfered hole.

7. The method of welding as set forth in claim 1, said column having a height in the range from 0.005 to 0.020 inch.

8. The method of welding as set forth in claim 1, said column of gas being air.

9. The method of welding as set forth in claim 1, and moving said layers over said aperture whereby to effect a seam weld.

10. The method of welding as set forth in claim 1, said layers of film comprising non-oriented low density polyethylene film.

11. The method of welding two superposed layers of thin thermoplastic film comprising:
    providing a support surface having a cavity;
    disposing the two layers of thin thermoplastic film in superposition upon said surface and cavity;
    providing a resonator adapted to be resonant at an ultrasonic frequency for producing ultrasonic frequency energy, and
    without bringing the resonator into physical contact with said layers of thermoplastic film coupling the ultrasonic frequency energy provided by said resonator to said layers of thermoplastic film at the area of said cavity by means of a layer of gas disposed between said resonator and said layers of film to effect welding of said layers.

12. The method of welding as set forth in claim 11, said gas being air.

* * * * *